June 4, 1935.  J. J. MASCUCH  2,003,808
LIQUID TANK
Filed June 5, 1933  3 Sheets-Sheet 1
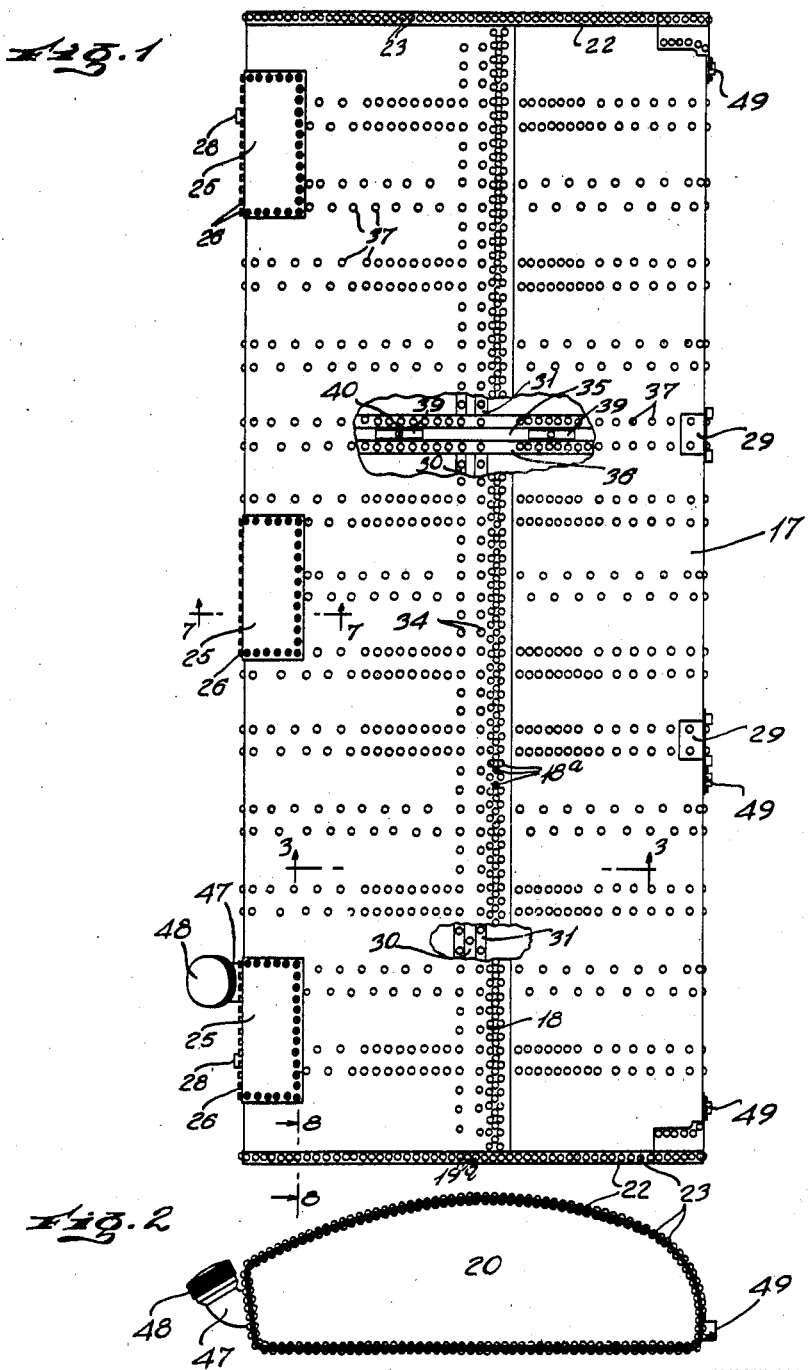
INVENTOR
JOSEPH J. MASCUCH
BY C. C. Cousins
ATTORNEY June 4, 1935.  J. J. MASCUCH  2,003,808
LIQUID TANK
Filed June 5, 1933   3 Sheets-Sheet 2
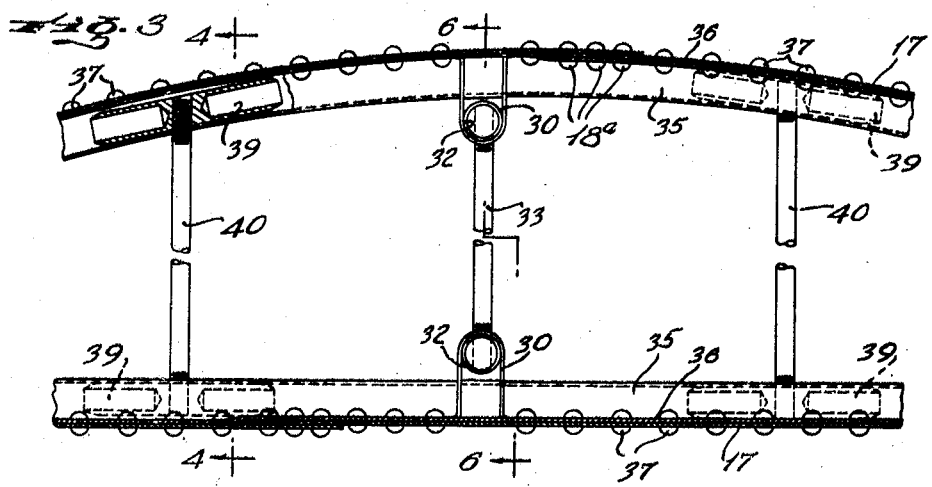
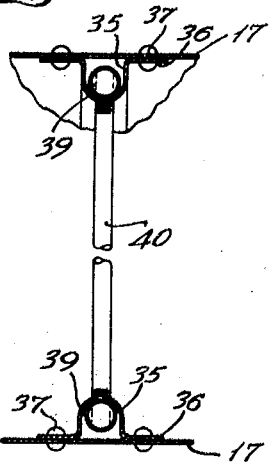
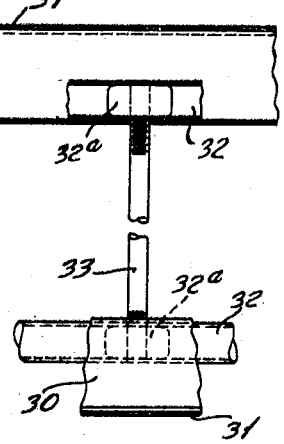
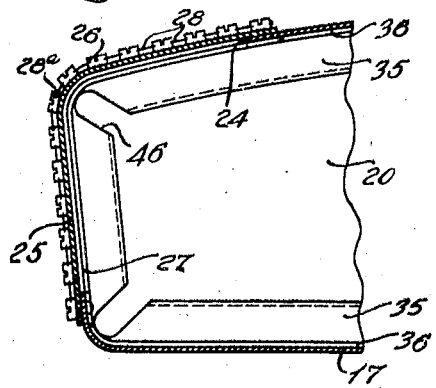
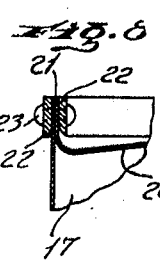
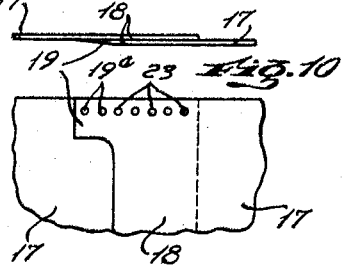
INVENTOR
JOSEPH J. MASCUCH
BY C. C. Cousins
ATTORNEY

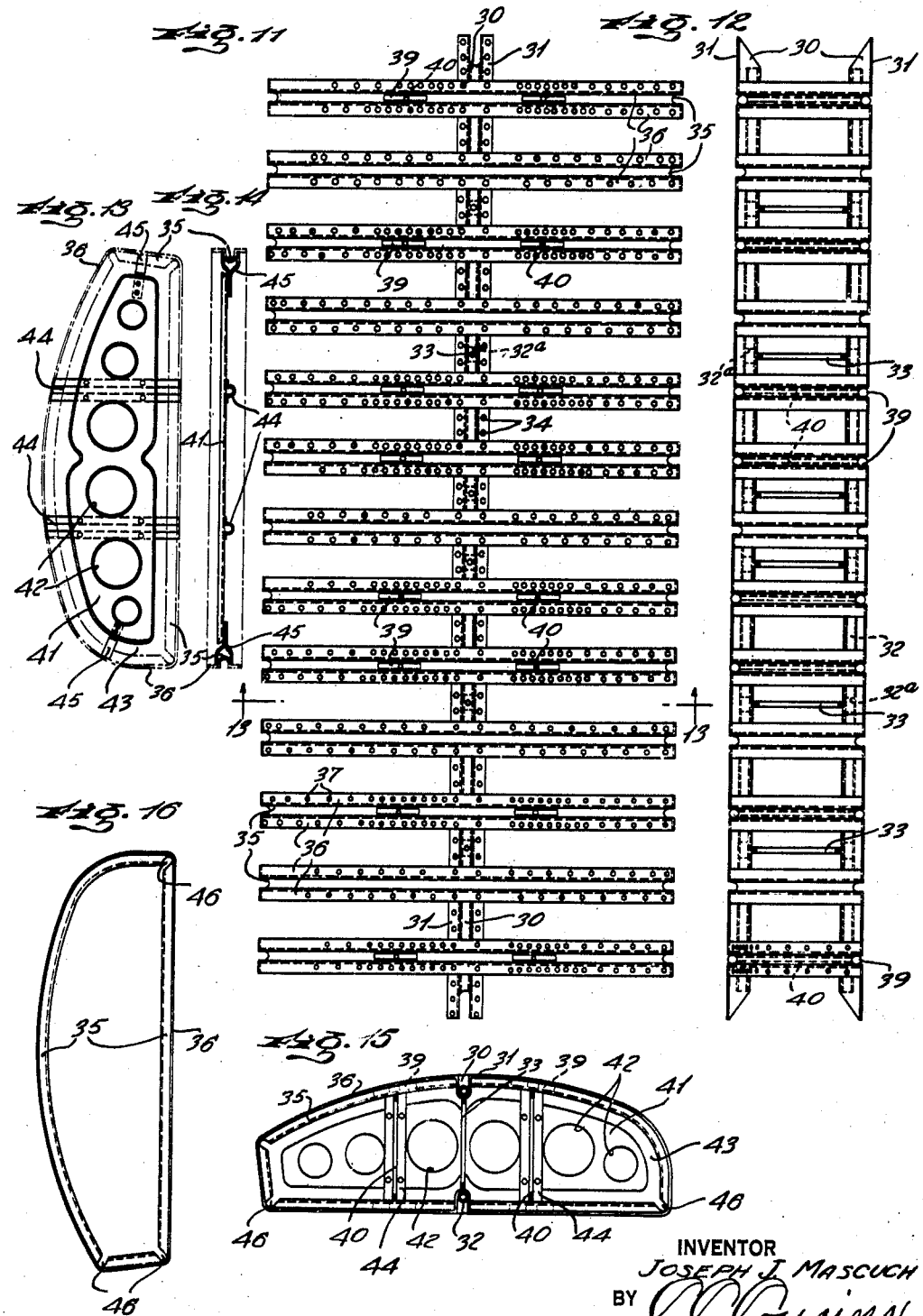

Patented June 4, 1935

2,003,808

UNITED STATES PATENT OFFICE 2,003,808

LIQUID TANK

Joseph J. Mascuch, Newark, N. J.

Application June 5, 1933, Serial No. 674,284

7 Claims. (Cl. 220—71)

This invention relates to fluid tanks for use in connection with vehicles such as airplanes, automobiles, etc., where strength cannot be disregarded in favor of lightness and weight, but at the same time must be extremely light and sufficiently rigid to withstand the stresses and vibrations set up in use.

The object of the invention is to provide a construction of this character particularly adapted to be installed on the fuselage of airplanes and one which may be made from very light gauge aluminum alloy sheet stock, and having its parts riveted together.

I am aware that attempts have been made to form fuel tanks for airplanes from aluminum alloy sheet metal and to rivet the parts together, but the object of my invention is more specifically to make a construction which is so strengthened and arranged as to withstand the vibrations and stresses set up in actual use on airplanes.

More specifically, an object of the invention is to provide a stiffening and strengthening construction which is intra-related so that the stresses set up by use on an airplane are distributed over wide areas of the body of the tank so that it will stand up under actual use.

The invention consists of the construction, combination and arrangement of parts, as herein illustrated, described and claimed.

In the accompanying drawings, forming a part hereof, is illustrated a form of embodiment of the invention, in which drawings similar reference characters designate corresponding parts, and, in which:

Figure 1 is a plan view, partly broken away;

Figure 2 is an end elevation;

Figure 3 is a transverse section taken approximately on line 3—3 of Figure 1, looking in the direction indicated by the arrow;

Figure 4 is a vertical section taken longitudinally of the tank, approximately along line 4—4 of Figure 3;

Figure 5 is a fragmentary detail in elevation of a part of one of the longitudinal stiffening members, illustrating how the circumferential members pass through the longitudinal members;

Figure 6 is a vertical section taken longitudinally of the tank, approximately along line 6—6 of Figure 3;

Figure 7 is a vertical section taken approximately on line 8—8 of Figure 1, illustrating the removable plate used in connection with the tank;

Figure 8 is a horizontal section taken approximately on line 8—8 of Figure 1, illustrating the construction of the connection between the head and the body of the tank;

Figure 9 is an end elevation showing the lapping ends of the continuous strip of metal forming the body of the tank;

Figure 10 is a fragmentary detail in bottom plan showing the method of securing the extreme ends of the overlapping portion of the body of the tank;

Figure 11 is a plan view of the re-inforcing elements of the construction, the outer wall of the tank being removed;

Figure 12 is a side elevation of the re-inforcing elements of the construction, the outer wall of the tank being removed;

Figure 13 is a transverse section taken approximately on line 13—13 of Figure 11, looking in the direction indicated by the arrow;

Figure 14 is an edge elevation of the parts shown in Figure 13;

Figure 15 is an elevation of one of the baffles shown in Figure 13, but taken from the opposite side; and, Figure 16 is an elevation of one of the circumferential ribs shown separately.

Referring to the drawings, 17 designates a continuous sheet of thin-gauge aluminum alloy metal stock, which is bent to assume the form shown in end elevation in Figure 2. In applying a tank to the fuselage of an airplane the curved wall is placed against the wall of the fuselage and the straight side is presented inside with the filling opening at the top and the drain openings at the bottom.

The sheet 17 is overlapped at its ends (as best shown in Figure 9) at 18 for an appreciable distance, and the ends of the underlapped portion are extended into shoulders or surfaces 19 to receive additional securing means 19a at the extreme ends of the overlapping portion. The overlapped ends of the body 17 are securely held together in a liquid-proof seam by a plurality of rows of rivets 18a, the rivets in each row being staggered with relation to the rivets in the next row so that approximately the entire length of the overlapped edges is covered by rivets.

The tubular body thus formed is closed at each end by a head 20 having an out-turned flange 21 and the flange and body are secured together by oppositely disposed re-inforcing strips 22 and a row of rivets 23 (as best shown in detail in Figure 8).

The body thus formed is provided with a plurality of openings 24, each of which is covered by a plate 25 removably secured in position by screws 26 passing through the sheet 16 into re-inforcing strips 27 disposed around the openings. The screws 26 are held against accidental displacement by vibration by means of wires 28 disposed through openings 28a in the heads of the screws. This provides a construction which prevents accidental displacement by vibration, but which permits the quick removal of the plates to effect repairs, as is best illustrated in Figure 7.

The tank thus formed is provided with lugs 29 at its bottom edge to co-operate with a similar fastening means provided on the body of the fuselage and to receive some form securing mechanism.

Disposed on the inner wall of the sheet 17 at the opposite sides thereof, are hollow ribs 30 provided with opposite flanges 31 to form stirrups loosely to receive floating tubular members 32 adapted to in turn receive heads 32a. Stay rods 33 have their opposite ends disposed through the wall of the floating and tubular members 32 and into the members 32a so that when the stay rods are tightened the tension produced thereby is evenly distributed over large areas of the wall 17 of the tank instead of being localized at a particular point. Rows of rivets 34 are used to secure the flanges 31 to the wall 17 and the U-shaped or stirrup construction of the ribs 30 effects a stiffening and strengthening of the wall 17.

Disposed transversely of the body of the tank 17 and against the inner wall thereof is a plurality of circumferential stiffening ribs 35 constructed so as to form stirrups and provided with flanges 36, which by means of rivets 37 may be secured against the inner face of the wall 17. The longitudinal stirrups 30 are provided with openings 38 to permit the passage of the circumferential stirrups 35 so that they may be made continuous around the entire inner face of the wall 17.

Floating securing members 39 are disposed in the circumferential stirrups 35 to receive the opposite ends of the stud rods 40, and as in the instance of the longitudinal stirrups 30 when tension is provided on the rods 40, it is transmitted through the stirrups over a large area of the wall 17 of the tank.

To control the movement of the liquid fuel carried in the tank and to prevent its weight and movement being centralized at one point of the tank and resulting in stresses and strains which the tank might not be able to withstand, a plurality of baffles 41 are disposed transversely inside of the tank, are provided with openings 42 and are of a size to leave a space 43 around the edges of the baffles so as to permit a relief from pressure of the liquid fuel when it is displaced from end to end of the tank.

Stirrups 44 are secured transversely of the baffles 41 and are adapted to engage around the stay rods 40 so that the baffles are held in position but are not rigidly secured to the stay rods. At each end each baffle has secured thereto a strip 45 which is bifurcated at its outer end and extends over the adjacent circumferential stirrup 35, so that the baffle may be restrained from displacement, but at the same time is permitted to yield slightly to the movement of the liquid fuel.

In order that the circumferential ribs or stirrups may be bent to conform to the shape desired, the stirrup portion 25 may be cut away as at 46 (as shown in Figures 7, 15 and 16), but the flanges 36 thereof are continuous. The tank is provided with the usual filling conduit 47 covered by a removable cap 48, and suitable drain plugs 49 are provided at the opposite edge of the tank.

In the application of the tank to the fuselage of an airplane any vibration or stress set up in one area of the wall 17 is transmitted to the adjacent stirrup 35 or the stirrup 30 and through its adjacent stay rod 33 or 40 is transmitted to the opposite stirrup 30 or 35 and distributed over a wide area through the flanges of the stirrups so that such vibrations or stresses are not localized at any one particular point. The connections between the stay rods 33 and 40 and their connecting heads in the stirrups 30 and 35 are of a floating nature and permit relative slight movement of the wall of the tank permitting it to flex or "breathe", and in that way a dampening effect is had on vibrations or stresses set up. The stresses set up by reason of movement of the liquid fuel in the tank are distributed by being taken up by the baffles 41 which are loosely carried on the stay rods 40 and such stresses are likewise evenly distributed and not localized.

Having thus fully described the invention, what is claimed as new and desired to be secured by Letters Patent, is:

1. A liquid tank formed of thin gauge metal, tubular re-inforcing ribs secured to the inner face of the tank, floating connecting members disposed in the tubular ribs and stay rods having their ends connected to the floating means.

2. A tank formed of a single sheet of metal having its edges overlapped and secured together, a closure secured at each end of the sheet, hollow ribs disposed longitudinally on the inside of the tank, floating elements disposed in the ribs and stay rods connecting the floating elements from one side to the other of the tank.

3. A tank formed of a single sheet of metal having its edges overlapped and secured together, a closure secured at each end of the sheet, hollow ribs disposed longitudinally on the inside of the tank, circumferential hollow ribs secured to the inner face of the tank and disposed through the longitudinal ribs, floating elements disposed in the ribs and stay rods connecting the floating elements from one side to the other of the tank.

4. A tank formed of thin gauge metal, means for re-inforcing the tank longitudinally and circumferentially, stay rods non-rigidly secured to the re-inforcing means, stirrups non-rigidly secured to the stay rods, and baffles carried by the stirrups.

5. A tank comprising a closed, hollow body, tubular re-inforcing ribs secured to the inner face of the tank, stay rods loosely secured to the ribs and baffles carried by the stay rods.

6. A tank comprising a closed, hollow body, tubular re-inforcing ribs secured to the inner face of the tank, stay rods loosely secured to the ribs and baffles movably carried by the stay rods.

7. A tank comprising a closed, hollow body, tubular re-inforcing ribs secured to the inner face of the tank, floating members in the tubular ribs and adjustable stay rods carried by the floating members.

JOSEPH J. MASCUCH.